(12) United States Patent
Vanhaecke et al.

(10) Patent No.: US 11,293,872 B2
(45) Date of Patent: Apr. 5, 2022

(54) LASER ABLATION PROBE (71) Applicant: UNIVERSITEIT GENT, Ghent (BE)

(72) Inventors: Frank Vanhaecke, De Pinte (BE); Stijn Van Malderen, Lokeren (BE)

(73) Assignee: UNIVERSITEIT GENT, Ghent (BE)

( * ) Notice: Subject to any disclaimer, the term of this patent is extended or adjusted under 35 U.S.C. 154(b) by 0 days.

(21) Appl. No.: 15/512,751

(22) PCT Filed: Sep. 18, 2015

(86) PCT No.: PCT/EP2015/071525
§ 371 (c)(1),
(2) Date: Mar. 20, 2017

(87) PCT Pub. No.: WO2016/042165
PCT Pub. Date: Mar. 24, 2016

(65) Prior Publication Data
US 2017/0299522 A1 Oct. 19, 2017

(30) Foreign Application Priority Data

Sep. 18, 2014 (EP) .................................... 14185463

(51) Int. Cl.
*G01N 21/71* (2006.01)
*G01N 1/04* (2006.01)
(Continued)

(52) U.S. Cl.
CPC ............. *G01N 21/718* (2013.01); *G01N 1/04* (2013.01); *H01J 49/0463* (2013.01); *H01J 49/105* (2013.01); *G01N 2001/045* (2013.01)

(58) Field of Classification Search
CPC .. G01N 21/718; G01N 1/04; G01N 2001/045; H01J 49/0463; H01J 49/105
See application file for complete search history.

(56) References Cited

U.S. PATENT DOCUMENTS 7,460,225 B2 * 12/2008 Karanassios ........... G01N 21/67
356/246
9,496,124 B2 * 11/2016 Gunther .............. H01J 49/0463
(Continued)

FOREIGN PATENT DOCUMENTS

| DE | 4200497 A1 | 7/1993 |
|---|---|---|
| WO | 2014079802 A2 | 5/2014 |
| WO | 2014169394 A1 | 10/2014 |

OTHER PUBLICATIONS

Extended European Search Report for corresponding European Application No. 14185463.8, dated Mar. 9, 2015.
(Continued)

*Primary Examiner* — Violeta A Prieto
(74) *Attorney, Agent, or Firm* — Workman Nydegger (57) ABSTRACT

A laser ablation probe comprises a tubular element adapted for conducting a carrier fluid in a substantially laminar flow. The tubular element comprises a fluid inlet and a fluid outlet arranged at opposite end portions of the tubular element for enabling the carrier fluid to flow through the tubular element. The tubular element further comprises a central portion having an aperture defined therein for admitting an aerosol generated by laser ablation from a material sample into the carrier fluid flow when this sample is positioned outside the tubular element at a distance in the range of 0 μm to 100 μm from the aperture.

21 Claims, 6 Drawing Sheets

(51) Int. Cl.
  *H01J 49/04* (2006.01)
  *H01J 49/10* (2006.01)

(56) References Cited

U.S. PATENT DOCUMENTS

| | | | | |
|---|---|---|---|---|
| 9,922,811 | B2* | 3/2018 | Gunther | H01J 49/0463 |
| 10,622,199 | B2* | 4/2020 | Loboda | H01J 49/0004 |
| 2003/0120200 | A1* | 6/2003 | Bergheim | A61F 9/007 |
| | | | | 604/27 |
| 2008/0272294 | A1 | 11/2008 | Kovtoun | |
| 2011/0240839 | A1* | 10/2011 | Hutchinson | H01J 49/0409 |
| | | | | 250/282 |
| 2012/0079894 | A1 | 4/2012 | Van Berkel et al. | |
| 2013/0042703 | A1* | 2/2013 | Hutchinson | H01J 49/0409 |
| | | | | 73/864.84 |
| 2013/0168545 | A1* | 7/2013 | Clem | H01J 49/0004 |
| | | | | 250/282 |
| 2014/0287953 | A1* | 9/2014 | Gunther | H01J 49/0463 |
| | | | | 506/9 |
| 2014/0288693 | A1* | 9/2014 | Summerfield | G06T 7/74 |
| | | | | 700/166 |
| 2016/0049283 | A1* | 2/2016 | Gunther | H01J 49/0463 |
| | | | | 250/423 R |
| 2017/0148619 | A1* | 5/2017 | Gunther | H01J 49/0463 |
| 2019/0180996 | A1* | 6/2019 | Loboda | H01J 49/105 |
| 2019/0371590 | A1* | 12/2019 | Wilkins | H01J 49/0404 |
| 2019/0391056 | A1* | 12/2019 | Staal | G01N 1/2806 |
| 2020/0009866 | A1* | 1/2020 | Mcmullen | B41J 2/14233 |
| 2020/0262203 | A1* | 8/2020 | Mardilovich | B41J 2/14233 |

OTHER PUBLICATIONS

International Search Report for corresponding International PCT Application No. PCT/EP2015/071525, dated Nov. 3, 2015.
Wang et al., "Fast Chemical Imaging at High Spatial Resolution by Laser Ablation Inductively Coupled Plasma Mass Spectrometry," Analytical Chemistry, Aug. 18, 2013, pp. 10107-10116, vol. 85.
Summerfield et al., "TP24 Study of LA-ICPMS Transport Effects Using a Theoretically Ideal Sample Chamber," 2012 Winter Conference on Plasma Spectrochemistry, Jan. 9-14, 2013, p. 155.
Summerfield, "A Study of LA-ICP-MS Transport Effects Using a Theoretically Ideal Sample Chamber," New Wave Research, Jan. 2013, 2 Pages.
Extended European Search Report from EP Application No. 15763949.3, dated Mar. 14, 2019.

* cited by examiner

070 → 071 — provide tubular element with aperture

072 — generating laminar flow of carrier fluid in tube

073 — positioning sample at 0-100 μm from aperture

074 — impinging laser beam on sample

075 — capturing aerosol in carrier fluid via aperture

076 — delivering carrier fluid with aerosol to outlet

LASER ABLATION PROBE

FIELD OF THE INVENTION

The invention relates to the field of laser ablation for sample characterization. More specifically, it relates to apparatus for capturing laser ablation-generated aerosol, and the transport to, and introduction of, said aerosol into an apparatus for characterization of said aerosol. The apparatus employed in the Laser Ablation Inductively Coupled Plasma Optical Emission Spectrometry (LA-ICP-OES) and the Laser Ablation Inductively Coupled Plasma Mass Spectrometry techniques (LA-ICP-MS), capable of analyzing the elemental composition of material such as aforementioned aerosol, exemplify said apparatus for characterization of said aerosol.

BACKGROUND OF THE INVENTION

Ablation is a known technique for removing material from a sample (referred to as "sample", "material sample", "target", or the like), e.g., a solid sample, by irradiating the surface of the sample with a beam of radiation (e.g., a laser beam). The sample is often positioned within a confined space, referred to as an ablation chamber or cell. Upon radiation the targeted material is heated on a local scale, inducing the evaporation and ejection or sublimation or desorption of a portion of the targeted material, creating an aerosol (solid and/or liquid particles and/or vapor suspended in a carrier gas, e.g., helium gas), and a plasma at high energy fluxes. This aerosol may be subsequently transported to a sample preparation system (e.g., a plasma torch, a chromatograph) and/or an analysis apparatus via a transport conduit. Embodiments of the present invention may relate to a probe assembly for the collection of an aerosol generated by ablation and the efficient transport of this aerosol towards a probe outlet, e.g., towards an analysis system. Although methods are known in the art which involve direct sampling in the atmosphere, sampling at an injector or sampling into a liquid, the probe according to embodiments of the present invention relates to externally mountable laser ablation cells, as opposed to e.g., in-torch ablation. Particularly, the probe may be an externally mountable half-open cell of the tube cell type. It is known in the art to use laser ablation cells in laser plasma spectrochemistry, for example in LA-ICP-MS, LA-ICP-OES or LIBS.

Ablation as a means of sample introduction for ICP-MS and ICP-OES permits the direct analysis of solid materials. LA-ICP-MS offers spatially resolved information for large sample areas at a lateral resolution in the order of a few µm, and high detection power, whilst retaining a quantitative character in a wide concentration range. The ability to characterize the distribution of major, minor and trace nuclides has led to applications in a wide variety of fields, e.g., in geology, mineralogy, archaeology, forensics, materials research, environmental studies, biochemistry, and biology. However, current LA-ICP-MS systems known in the art may have a relatively low lateral resolution and undesirable low sample throughput for compositional analysis with high spatial resolution. Transport of aforementioned aerosol to the mass spectrometer (MS) component can cause a broadening of the aerosol dispersion within the system, e.g., due to diffusion and convection in the laser ablation chamber and the conduits. In an LA-ICP-MS method known in the art, sequences of laser pulses may be monitored. The ablation positions may be varied according to a structured pattern, producing an image of the distribution of the targeted species. As aerosol of consecutive ablation events mixes due to the aerosol dispersion, the responses in the detector of the analysis apparatus corresponding to different ablation/sampling events, which may be performed at distinct sample locations, are consequently also mixed. Thus, the response is smeared out during scanning operation, and the lateral spatial resolution is therefore adversely affected. This disadvantage can be compensated for by operating at low sampling rates, effectively separating the pulse responses within one or more sequences of laser pulses, or by operating at high sampling rates and low scanning speeds, thereby mixing the dispersion of multiple overlapping pulse responses over a short scanning range. Both options lead to a decreased sample throughput and thus, increased operational costs. The extent of the negative effects thus exerted on the spatial resolution of aforementioned image and/or sample throughput is governed by the time window in which a detectable pulse response is still present in the detector component of the analysis apparatus (referred to as "washout time" or "washout"). Furthermore, the broadening of the response profile will reduce the signal intensity, and therefore also the sensitivity, which in turn restricts the spatial resolution at which can be sampled. Efforts within the LA-ICP-MS community have been directed to the development of ablation cell types permitting the impact of dispersion processes to be reduced, as these affect sensitivity, throughput times, and spatial resolution in the aforementioned detrimental way. These efforts have resulted in a number of high-performance ablation cell geometries, capable of achieving washout times of 10-100 ms (as determined by the full pulse response width at 1% of the maximum of said isolated pulse response of a single laser pulse).

At least three geometric design types of external ablation cells are known in the art. A first type is based on a carrier fluid stream parallel to the aerosol ejection direction and orthogonal to the sample surface. The aerosol may be extracted from the sample surface into another cell compartment by a pressure gradient, e.g., by Venturi extraction. The second type of cell geometry is based on aerosol ejection orthogonal to the carrier gas stream. Laser ablation probe solutions of this type can be subdivided into two approaches: an open cell design and a closed cell design. In the latter, the sample is fully enclosed into the ablation chamber. For example, cylindrical closed cells are known in the art that have a circular cross-section with a diameter in the range of 1 cm to 10 cm and have a volume in the range of 10 cm$^3$ to 100 cm$^3$. Such cells may have been considered as a 'standard' ablation cells in the art for decades, and have a typical washout time in the range of 0.50 s to 5.00 s. Ablation cells of this cell type can have a cylindrical, cubic, diamond or tear-droplet geometry. The open design can float over or can be mounted on top of the sample. A spray nozzle pushes the aerosol to an outlet, connected to transport conduits.

In a tube cell, corresponding to the third cell type, the cell is of similar dimension as the conduit, and aerosol ejection occurs predominantly in a direction orthogonal or parallel to the carrier gas stream. Such cell is for example disclosed in "Fast Chemical Imaging at High Spatial Resolution by Laser Ablation Inductively Coupled Plasma Mass Spectrometry" by Wang et al., published in Analytical Chemistry 2013, 85, 10107-10116. The cell disclosed by Wang et al. has a closed design, with aerosol ejection occurring predominantly in a direction parallel to the local He carrier gas stream velocity vector, and comprises a tube connected to an outlet for collecting the aerosol, in which this tube is arranged at an operational distance of about 350 µm from the surface of the material sample. An aperture of 4.5 mm allows the aerosol to enter the tube element. Furthermore, the tubing diameter is 3 mm in the cell disclosed by Wang et al. This low-dispersion cell was reported to offer a washout time of approximately 30 ms. To achieve such a short washout time, the specially designed low-volume cell was located not more than about 500 mm away from the torch inlet of an ICP-MS device. Owing to the improved sensitivity, this cell permits imaging at the µm-level. Nevertheless, numerous analytical applications would still benefit from higher lateral resolutions, as nuclide distributions at the nm-level within µm-sized features could reveal essential information on trace element patterns, for example in geological samples, surface layer phenomena in solid samples and biomarker distributions on subcellular levels.

It has been shown that an extreme reduction of the cell volume by miniaturization of the cell, for example, to a volume in the range of 0.18 to 0.25 cm$^3$ did not result in further improvements of sensitivity. In contrary, longer washout times (hypothesized to be caused by particle adsorption onto the cell walls) or lower signal to noise (S/N) ratios were observed relative to their larger counterparts, e.g., having a volume in the range of 0.70 to 1.50 cm$^3$. This may have led to a general belief in the technical field that cell miniaturization was not appropriate due to adverse aerosol-wall interaction. However, surprisingly, the inventors of the present invention have found that geometric design rather than volume may be the limiting factor for cell dispersion.

SUMMARY OF THE INVENTION

It is an object of embodiments of the present invention to provide good and efficient means and methods for entrainment and transport of aerosols, such as for example an aerosol generated by laser ablation.

It is an advantage of embodiments of the present invention that local continuous sampling of a material sample using a probe can be achieved.

It is an advantage of embodiments of the present invention that efficient transport of particles, e.g., aerosol particles, can be obtained.

It is an advantage of embodiments of the present invention that the interior wall of the probe, e.g., the pseudo-cylindrical wall of the cavity, can reflect and direct the plasma shockwave towards the plume of particles efficiently, directing said plume towards the high-velocity trajectories of carrier gas atoms, located in the center of the tube.

It is an advantage of embodiments of the present invention that a high performance can be achieved in a laser plasma spectrochemistry setup.

It is an advantage of embodiments of the present invention that a stable quasi-laminar flow can be obtained, even in regions near the aperture.

It is an advantage of embodiments of the present invention that transport of aerosol particles can be optimised resulting in little or no deposition of aerosol particles on the walls of the tubular element, i.e. resulting in optimal, stoichiometric transport.

It is an advantage of some embodiments of the present invention that the ablation cell allows laser radiation to be introduced through all ablation cell walls, permitting flexibility in the arrangement of optical components.

It is an advantage of embodiments of the present invention that an ablation cell according to embodiments can be manufactured at low cost, e.g., can be provided as a consumable product.

The above object is accomplished by a method and device according to the present invention.

The present invention relates to an ablation probe comprising a tubular element adapted for conducting a carrier fluid in a substantially laminar flow, said tubular element comprising a fluid inlet and a fluid outlet arranged at opposite end portions of the tubular element for enabling said carrier fluid to flow through the tubular element, a central portion having an aperture defined therein for directly injecting an aerosol generated by laser ablation from a material sample into the carrier fluid flow when said sample is positioned outside said tubular element at a distance in the range of 0 µm to 100 µm from said aperture, wherein said central portion curves or extends outward with respect to the tubular element in a direction substantially orthogonal to said aperture. The latter may result in that the tubular element is only locally contacting the sample around the aperture. The central portion is configured for generating, in the central portion, the carrier fluid flow substantially parallel to the sample. The central portion may have a transparent wall transparent for laser radiation used for laser ablating. The central portion may have, for example at one side, for example opposite to the side where the aperture is present, a transparent wall or transparent window, transparent for laser radiation, used for laser ablating, and other radiation, e.g., microscopy illumination.

Said central portion may curve outward with respect to the tubular element in a direction substantially orthogonal to the aperture such as to form an acute angle at the central portion between the fluid inlet and a direction substantially parallel to the aperture in the range of 1° to 45°.

The central portion may curve outward with respect to the tubular element in a direction substantially orthogonal to the aperture such as to form an acute angle at the central portion between the fluid outlet and a direction substantially parallel to the aperture in the range of 1° to 45°.

An exterior wall of the central portion of the tubular element may be shaped so as to induce a local protruding portion around the aperture for contacting the sample.

The aperture may encompass a surface area less than or equal to a cross-sectional area spanning the opening of said tubular element in said central portion.

The cross-sectional area spanning the opening of said tubular element may correspond to a cross-section of the tubular element having a maximum inner diameter of 2 mm or less, and/or wherein said central portion is shaped so as to restrict the contact area between the tubular element and a flat sample to less than 2 mm$^2$. The cross-sectional area of the tubular element may have a substantially circular or circular, a substantially elliptical or elliptical or another not cornered shape whereas in other embodiments the cross-sectional area of the tubular element may have a square, a rectangle or another cornered shape such as a polygonal shape.

The distance between said aperture and the fluid outlet of the tubular element may range between 50 and 5000 mm.

The central portion may be adapted for transmitting a laser radiation beam through the tubular element such as to generate said aerosol from said material sample by laser ablation.

The aperture may have a substantially elliptical or circular shape and/or wherein said tubular element has a substantially circular or elliptical cross-sectional shape. In some embodiments, the aperture also may be square, rectangular, cornered, . . . .

The fluid outlet may be adapted for directly connecting to an injector of an inductively coupled plasma torch.

The laser ablation probe may furthermore comprise a sample platform for supporting the material sample, said sample platform being adapted for translating, flexing, rotating and/or tilting the material sample with respect to the aperture.

The laser ablation probe may furthermore comprise a housing enclosing said tubular element and adapted for containing the material sample in a controlled atmosphere.

The laser ablation probe may furthermore comprise a plurality of micro-jets adapted to provide a sheathing gas stream to prevent or reduce mixing of a gaseous environment external to the tubular element with the carrier fluid via the aperture.

The present invention also relates to a laser plasma spectrochemistry system comprising a laser ablation probe as described above and a spectrochemical analysis device, wherein the fluid outlet of the tubular element of said laser ablation probe is operably connected to a fluid sample input of the spectrochemical analysis device.

The present invention furthermore relates to a method for aerosol collection from a material sample, the method comprising providing a tubular element having an aperture defined in a central portion thereof, wherein the central portion curves or extends outward with respect to the tubular element in a direction substantially orthogonal to the aperture, generating a substantially laminar flow of a carrier fluid through the tubular element, positioning a material sample outside of said tubular element at a distance in the range of 0 μm to 100 μm from said aperture, impinging a laser beam on said material sample to generate an aerosol from said material sample by laser ablation, capturing said aerosol in the carrier fluid through said aperture and delivering the carrier fluid entraining the aerosol to an outlet of the tubular element. The central portion may curve or extend outward with respect to the tubular element in a direction substantially orthogonal to the aperture so that the tubular element is only locally contacting the sample around the aperture.

Particular and preferred aspects of the invention are set out in the accompanying independent and dependent claims. Features from the dependent claims may be combined with features of the independent claims and with features of other dependent claims as appropriate and not merely as explicitly set out in the claims.

These and other aspects of the invention will be apparent from and elucidated with reference to the embodiment(s) and annexed drawings described hereinafter.

BRIEF DESCRIPTION OF THE DRAWINGS

FIG. 1A and FIG. 1B schematically illustrate an apparatus for entraining ejected target material according to embodiments of the present invention. This illustration comprises a probe and part of a conduit, in perspective.

FIG. 2 schematically illustrates cross-sectional views of probes according to embodiments of the present invention. The cross-sections are located in the plane of bilateral symmetry.

FIG. 2A schematically illustrates a cross-sectional view of a probe according to one embodiment of the present invention shown in FIG. 1A.

FIG. 2B is an enlarged view of the central part of FIG. 2A.

FIG. 2C schematically illustrates a cross-sectional view of a probe according to one embodiment of the present invention shown in FIG. 1B.

FIG. 3 schematically illustrates an inductively coupled plasma torch assembly with surrounding metallic coil and exemplifies the use of a conduit outlet adapted for insertion into an injector of an inductively coupled plasma torch.

FIG. 4 schematically illustrates a laser ablation probe according to one embodiment of the present invention that comprises a housing for containing a material sample in a controlled atmosphere.

FIG. 5 schematically illustrates a laser plasma spectrochemistry system according to embodiments of the present invention.

FIG. 6 shows a method according to embodiments of the present invention.

FIG. 7 shows a temporal signal intensity profile for $^{27}$Al when ablating National Institute of Standards and Technology (NIST, Gaithersburg, USA) Standard Reference Material (SRM) 612 at a pulse repetition rate of 50 Hz for an example illustrating embodiment of the present invention.

FIG. 8 shows a first detail temporal signal intensity profile corresponding to FIG. 7 for a different time axis, relating to the example illustrating embodiment of the present invention.

FIG. 9 shows a second detail temporal signal intensity profile corresponding to FIG. 7 for a different time axis, relating to the example illustrating embodiment of the present invention.

FIG. 10 shows a temporal signal intensity profile at a pulse repetition rate of 200 Hz, relating to the example illustrating embodiment of the present invention.

FIG. 11 shows a temporal signal intensity profile at a pulse repetition rate of 300 Hz, relating to the example illustrating embodiment of the present invention.

FIG. 12 schematically illustrates the velocity vector scale distribution of He atoms within a probe according to one embodiment of the present invention, obtained by a computational fluid dynamics simulation.

FIG. 13 shows snapshots in a hatchet-pattern of the temporal evolution of a blast wave propagation simulation in a cross-section of a tubular element, demonstrating the concept of plasma shockwave reflection Any reference signs in the claims shall not be construed as limiting the scope.

In the different drawings, the same reference signs refer to the same or analogous elements.

DETAILED DESCRIPTION OF ILLUSTRATIVE EMBODIMENTS

The present invention will be described with respect to particular embodiments and with reference to certain drawings, but the invention is not limited thereto but only by the claims. The drawings described are only schematic and are non-limiting. In the drawings, the size and relative size of some of the elements may be exaggerated and not drawn on scale for illustrative purposes. The dimensions and the relative dimensions do not correspond to actual reductions to practice of the invention.

Furthermore, the terms first, second and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments of the invention described herein are capable of operation in other sequences than described or illustrated herein.

Moreover, the terms top, under and the like in the description and the claims are used for descriptive purposes and not necessarily for describing relative positions. It is to be understood that the terms so used are interchangeable under appropriate circumstances and that the embodiments of the invention described herein are capable of operation in other orientations than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments. Similarly it should be appreciated that in the description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

The terms "substantially" or "approximately" may be applied in the context of any quantitative representation that could permissibly vary without changing the basic function or process to which it is related.

Furthermore, while some embodiments described herein include some, but not other features included in other embodiments, combinations of features of different embodiments are meant to be within the scope of the invention, and form different embodiments, as would be understood by those in the art. For example, in the following claims, any of the claimed embodiments can be used in any combination.

By way of illustration, embodiments of the present invention not being limited thereto, standard and optional features of the present invention will be illustrated hereinbelow.

In the description provided herein, numerous specific details are set forth. However, it is understood that embodiments of the invention may be practiced without these specific details. In other instances, well-known methods, structures and techniques have not been shown in detail in order not to obscure an understanding of this description.

Figure 1A:
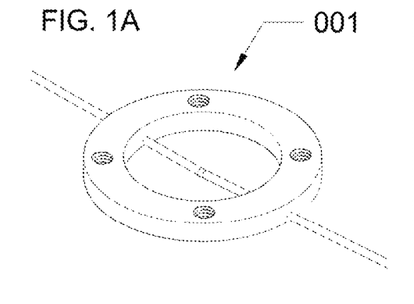
Figure 1B:
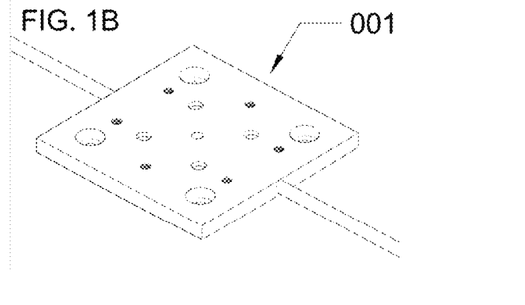
Figure 2A:
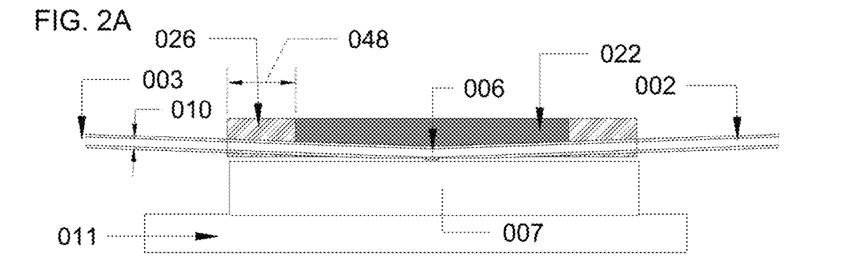
Figure 2B:
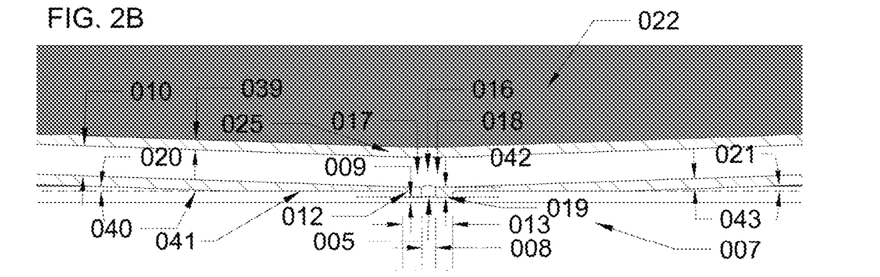
Figure 2C:
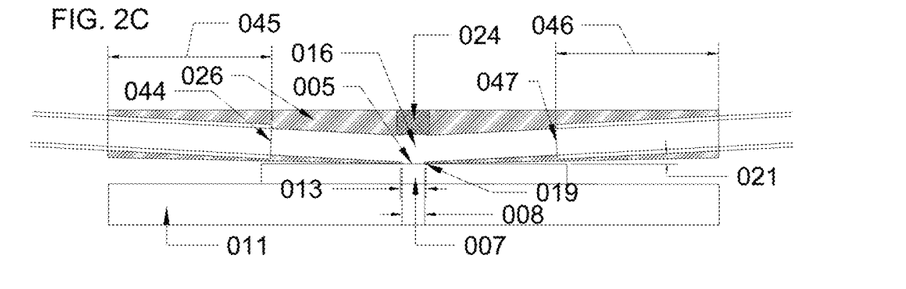

FIG. 1A and FIG. 1B show a laser ablation probe 001 according to embodiments of the present invention. FIG. 2A, FIG. 2B and FIG. 2C show cross-sectional views in the plane of bilateral symmetry of probes according to embodiments, which were also depicted in FIG. 1A and FIG. 1B. In a first aspect, the present invention relates to a laser ablation probe 001 that comprises a tubular element 002, which acts as a conduit. This tubular element is adapted for conducting a carrier fluid, e.g., a carrier gas, in a substantially laminar flow. The tubular element 002 comprises a fluid inlet 003 and a fluid outlet 004, arranged at opposite end portions of the tubular element respectively for enabling the carrier fluid to flow through the tubular element. The geometry of the tubular element may be simple, e.g., the tubular element may have a substantially uniform cross-section over its length, such that the formation of vortices and eddies near discontinuities is avoided or reduced. The tubular element 002 also comprises a central portion 006, e.g., a central portion spaced away from both opposite end portions, that has an aperture 005 defined therein. This laser ablation probe 001 may be a miniaturized tube cell, even though the advantages of embodiments of the present invention are not obtained by a mere miniaturization of a known probe. However, miniaturization and a simple geometry allow the elimination of features that would impede the optimal operation of the probe, e.g., the use of tube connectors was circumvented by integrating the conduits into the probe cell itself, and the tubular element 002 may be even integrated into the injector 015 of a torch assembly 014. In embodiments of the present invention, the carrier medium may be a gas, for example an inert gas such as helium, although in other embodiments, the carrier medium may be a liquid. More generally, the carrier medium may be a fluid. For example, the tubular element may have a rectangular, circular or elliptical cross-sectional shape. Said shapes may contain chamfers or fillets. The tubular element may be composed of and/or coated with at least one inert or deactivated material. For example, the tubular element 002 may be manufactured from polytetrafluoroethylene (PTFE), while the central portion 006 may be manufactured from poly(methyl methacrylate) (PMMA). In one embodiment, the central portion may be manufactured from a transparent capillary. However, any sufficiently inert or deactivated material may be a suitable alternative for the material used to manufacture the central portion, insofar taking other design constraints into account, such as mechanical, magnetic and thermal properties of the material, as will be understood by the person skilled in the art.

Furthermore, in embodiments of the present invention, the laser ablation probe may comprise a plurality of tubular elements arranged towards the central chamber, for providing fluid flow with a uniform substantially laminar flow pattern towards the outlet. Furthermore, it should be appreciated that more than one probe could be positioned onto a sample simultaneously, each of said probes provided with a laser beam for the purpose of ablation.

Figure 3:
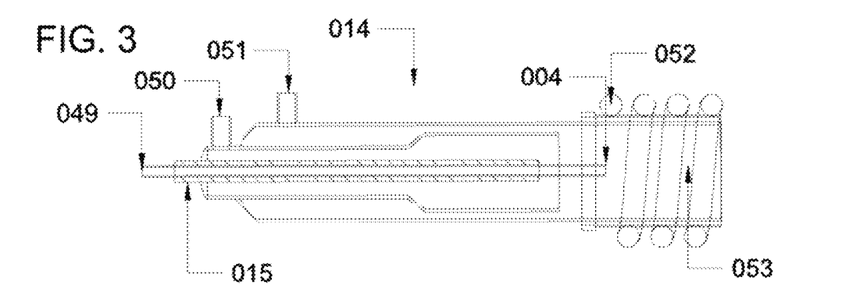

As detailed further herebelow, the fluid outlet 004 may be adapted for directly connecting to an injector 015 of an inductively coupled plasma torch assembly 014. The fluid outlet of the tubular element 004 may comprise a tube segment that may be inserted into an injector 015 of an inductively coupled plasma torch assembly 014 or that may even be integrated with such ICP torch inlet, as illustrated in FIG. 3, such that the risk of turbulence in the fluid flow due to a coupling at the torch inlet is reduced. The fluid inlet 003 may be specifically adapted for enabling the tubular element 002 to conduct the carrier fluid in a substantially laminar flow, for example, the inlet may comprise a mechanical grating to reduce or prevent the formation of eddies and vortices in the fluid flow.

The aforementioned aperture 005 is adapted for admitting an aerosol generated from a material sample 007 into the carrier fluid flow when this material sample is positioned outside the tubular element at a distance 009 in the range of 0 μm to 100 μm from the aperture 005. Said aperture 005 may have a rectangular or circular shape, which may be advantageously easy to manufacture, but embodiments of the present invention may not be limited to these shapes and any suitable or beneficial shape is allowed. The aperture 005 may encompass a surface area 008, which may be defined as the minimum achievable area for a surface closing the aperture 005 in the tubular element 002, less than or equal to a cross-sectional area 010 spanning the opening of said tubular element in said central portion. For example, the aperture may be defined by a perimeter rim formed in the central portion 006 that circumscribes a surface segment having a surface area 008 which may be less than or equal to a cross-sectional area spanning the opening of the tubular element in the central portion 010, or less than or equal to all such cross-sectional areas. A characteristic distance (such as a diameter, a length or width, etc.) of the aperture area thus typically may be not larger than a characteristic distance of a cross-sectional cut of the tubular element 002. The cross-sectional area 010 of the tubular element 002 in the central portion may corresponds to a cross-section of the tubular element having a maximum inner diameter of 2.00 mm or less, for example an inner diameter in the range of 0.10 mm to 2.00 mm, for example 1.00 mm. Particularly, the tubular element may have a substantially uniform cross-section, e.g., a uniform cross-section or a cross-section that varies only slightly due to a bending of an initially straight tube having uniform cross-section during manufacture of the probe, and the maximum inner diameter of this substantially uniform cross-section may be 2.00 mm or less. It should be appreciated that a gradual narrowing and/or broadening, and/or piecewise construction of the tubular element may be allowed, whilst operating within the constraints of a substantially laminar flow, i.e. the minimization of features, e.g., tubing connectors, that could induce a turbulent flow. In embodiments according to the present invention, the central portion 006 furthermore is shaped so as to reduce the contact area 013 of the tubular element with a flat sample. The central portion 006 may for example curve or extend outward with respect to the tubular element in a direction substantially orthogonal to the aperture. The outer wall of the central portion also may be processed so as to create a local protrusion 012 for contacting or approaching the sample locally.

While a laser ablation probe according to embodiments may be classified as being of the tube cell type, in particular a tube cell with aerosol ejection occurring predominantly in a direction orthogonal to the carrier fluid stream, the central inner chamber 016 may be substantially smaller than the transport conduit diameter due to the relatively small aperture size. The probe 001 can be used in contact with or in very close proximity to the sample, e.g., hovering the probe at a distance 009 less than 100 μm. This close proximity allows an efficient capture of laser ablation aerosol, even for a small aperture 005 size. Furthermore, the small aperture may not substantially influence the fluid flow, such that an efficient laminar flow is maintained. The aperture 005 may for example have a diameter in the range of 0.01-1.00 mm. The diameter of the tubular element is also small when compared to prior art tube cells, e.g., the tubular element may have an internal diameter smaller than 2.00 mm. Thus, the central chamber 016, between both opposite end portions 017,018 for aerosol capture also has a small volume, e.g., in the range of 0.01 to 3 mm³. The central chamber 016 may be defined as the volume in which the aerosol plume expands, before the aerosol is displaced away from the aperture. It is illustrated as the region between reference point 017 and 018.

Unlike particular ablation probes known in the art, where aerosol extraction parallel to the direction of ejection may be assisted by a pressure gradient, e.g., caused by a He flow, to be collected in a carrier gas stream, e.g., an Ar stream, in embodiments according to the present invention the extracted aerosol may be directly captured in a high-velocity carrier fluid flow, in the direction orthogonal to the direction of particle ejection, e.g., without requiring an assistive pressure gradient. This mode of operation allows the setup to maintain relative higher carrier fluid velocities without transferring from the laminar flow regime into a turbulent flow regime. A turbulent flow regime would be highly detrimental to the aerosol washout.

According to embodiments of the present invention, the central portion 006 curves or extends outward with respect to the tubular element 002 in a direction substantially orthogonal to the aperture 005. Thus, when the probe is brought in close proximity to the material sample, a minimum distance 009 between the tubular element 002 and the material sample 007, e.g., when this sample is sufficiently flat and well-aligned, is reached in said central portion. Therefore, a funnel effect causes gas from an atmosphere external to the tubular element to be driven away, e.g., by the carrier fluid leaking from the tubular element 002 at the aperture. However, the tubular element 002 is adapted to provide a substantially laminar flow from inlet to outlet, e.g., the tubular element may be of substantially uniform diameter and/or may be straight, piecewise straight or only slightly and gradually curved, such that aerosol expelled by ablation is efficiently captured into the fluid flow. Furthermore, when the tubular element comprises a curvature or protrusion 010 of the central portion 006, e.g., at the aperture, this allows the aperture to approach or to contact the surface locally, e.g., without risking contacting the material sample over a large contact area. The latter advantageously results in reducing or avoiding damaging of the sample 007, e.g., when translating the cell relative to the sample in the plane substantially parallel to the sample surface 007.

For example, the cell bottom (the surface of the probe to generally face towards the target) 019 may have a conical shape allowing contact of the cell with the surface of the material sample on a local μm-scale. A flat bottom may be optimized for surface contact with polished, flat samples and samples of low local curvature surfaces.

In embodiments according to the present invention, the central portion 006 may curve outward with respect to the tubular element in a direction substantially orthogonal to the aperture 005 such as to form an acute angle 020 at the central portion between the fluid inlet and a direction substantially parallel to the aperture in the range of 1° to 45°, for example in the range of 1° to 30°, or preferably in the range of 1° to 10°. In embodiments according to the present invention, the central portion 006 may curve outward with respect to the tubular element in a direction substantially orthogonal to the aperture 005 such as to form an acute angle 021 at the central portion between the fluid outlet and a direction substantially parallel to the aperture in the range of 1° to 45°, for example in the range of 1° to 30°, or preferably in the range of 1° to 10°. For example, the tubular element 002 may comprise two straight segments extending from the fluid inlet 003 and the fluid outlet 004 respectively toward the central portion 006, where these segments are joined at angles as defined hereinabove. The aperture may thus be formed at the apex of the angles thus formed.

This specific non-axial orientation of the central portion, the inlet and the outlet has numerous advantages. For example, no restrictions on sample size are imposed by requiring the sample to be enclosed within the tubing. Furthermore, as the tubular element approaches the sample surface locally, the probe will not contact nor damage surface features in other parts of the sample whilst scanning the probe over the surface. The local fluid velocity, e.g., the He atom velocity when a helium carrier gas is used, in close proximity to the sampling surface, e.g., less than 0.1 mm, increases as a result of the fluid flow coming from the inlet being directed towards the surface. Particles deposited near the ablation zone are hence swept up more efficiently, increasing the transport efficiency of the transport system. Furthermore, since the probe can be moved across the surface, the laser can always ablate in the central part of the probe, ensuring reproducible fluid dynamics during the entire analysis, irrespective of the position on the sample. Also, when the tubular element is mounted in a bracket, e.g., such as displayed in FIG. 1A, it is ensured that the laser beam does not interact with the bracket walls 022, even at large divergence angles of the laser beam 023. The latter advantageously allows for laser objectives characterized by a high numerical aperture to be used, and thus, allows for a smaller beam waist in the focus point, which increases the performance of the laser ablation spectrochemistry techniques in terms of lateral resolution. However, in embodiments according to the present invention, the central portion 006 may extend outward with respect to the tubular element 002 in a direction substantially orthogonal to the aperture 005. For example a protrusion 012 may be provided in the central portion 006 to space the tubular element 002 away from the material sample when the protrusion contacts the material sample 007, for example as illustrated in FIG. 2B. Such protrusion 012 may for example be an elevated rim of the aperture. The protrusion 012 may be manufactured by an additive material manufacturing technique, e.g., may be deposited on the tubular element, or may be obtained by removal of a layer of material from the tubular element 002, e.g., by etching away the material surrounding the protrusion to be manufactured.

The central portion 006 may also be adapted for transmitting a laser radiation beam 023 through the tubular element such as to generate the aerosol from the material sample 007 by laser ablation. For example, the probe may comprise an optical transmitter to allow the laser to enter the probe internal volume, such as, for example, an optical fiber or an optical window 024. The laser beam 023 may thus enter through a window, e.g., a $SiO_2$ or $MgF_2$ window, mounted on top of the central chamber. The transparent window is positioned opposite in a wall of the tubular element opposite the aperture. The tubular element in the central portion 025 may itself be such optical transmitter, e.g., the tubular element may be manufactured from a material transparent to laser irradiation. Thus, the laser beam 023 may also enter through the walls of the capillary which constitutes the probe 001 itself, e.g., under a non-orthogonal angle relative to the sample surface.

In embodiments of the present invention, a cladding may be provided on the internal or external surface of the tubular element 002 or bracket 022 to increase the luminescence on the material sample by reflecting light back to the sample. Furthermore, in embodiments of the present invention, supportive material from a bracket 026 supporting the tubular element may be selectively removed to increase the luminescence on the sample from direct light.

The laser ablation probe according to embodiments of the present invention may also comprise a plurality of microjets, e.g., gas outlet nozzles, adapted to provide a sheathing gas stream to prevent or reduce mixing of a gaseous environment external to the tubular element with the carrier fluid via the aperture, e.g., micro-jets could be specifically positioned and directed to provide such sheathing gas stream.

A near-field spectroscopy probe, e.g., a cantilevered hollow optical fiber probe, or an atomic force microscopy probe may be positioned in the central chamber 016, or below the probe 001.

Figure 4:
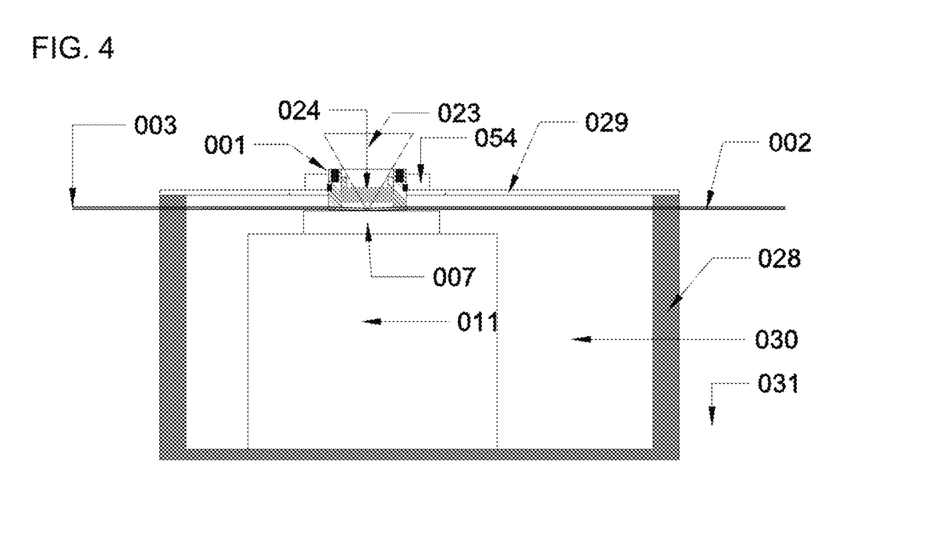

In embodiments according to the present invention, the laser ablation probe may also comprise a housing 028,029 enclosing part of the tubular element 002 and probe 001, and adapted for containing the material sample 007 in a controlled atmosphere 030, e.g., in an inert atmosphere, for example as illustrated in FIG. 4. Such enclosure may include a transmission window 029 to establish an optical pathway from the environment exterior to said housing towards the interior of said housing. It should be appreciated that said housing may be formed of multiple components joined together. Thus, in some embodiments of the invention the probe and sample can be mounted inside a larger housing to prevent or reduce mixing of the external environment gas 031, e.g., the ambient air, with the carrier fluid. Therefore, while particular embodiments of the present invention may relate to an ablation probe of the half-open tube cell type, other embodiments may relate to a closed cell ablation probe, e.g., as shown in FIG. 4. The laser ablation probe may also comprise a sample platform 011 for supporting the material sample, for example such that the material sample can be mounted on the sample platform. Said sample platform 011 and/or aforementioned housing may be adapted for translating, flexing, rotating and/or tilting the material sample with respect to the aperture and/or optical path. For example, the sample, sample platform or, in some embodiments, the housing containing the sample, may be mounted on a multi-axis rotation/tilt/flex/translation stage, or the like. However, in other embodiments, the laser ablation probe 001 may be adapted for being connected, e.g., mechanically connected, to a platform 027 adapted for translating, flexing, rotating and/or tilting the laser ablation probe and/or the optical path with respect to a material sample, e.g., the laser ablation probe may be adapted for connecting to a multi-axis rotation/tilt/flex/translation stage, or the like.

The sample platform 011 may also comprise a sample holder for mounting the material sample 007, e.g., on a cryogenic cooling unit.

The washout performance of an external ablation cell according to embodiments of the present invention used in an LA-ICP-MS system, when expressed in terms of the peak width at 1%, 10% and 50% of the maximum, may be approximately one order of magnitude better than that which can be observed for a state-of-the-art cell, such as the cell disclosed by Wang et al. discussed hereinabove. The resulting sample throughput, sensitivity and spatial resolution may accordingly reach higher levels. Surprisingly, the cell may perform better than theoretical particle transfer models published in literature predict, considering the distance between the sample chamber and the torch inlet of the ICP-MS device. The inlet 003 and outlet conduits 004 may be positioned under an angle, providing a technical solution for the restrictions on sample size, currently imposed on designs of the tube cell type with inlet and outlet oriented on the same axis. The invention provides an elegant, straightforward answer to the increasing demand for performance of our analytical technique.

Figure 5:
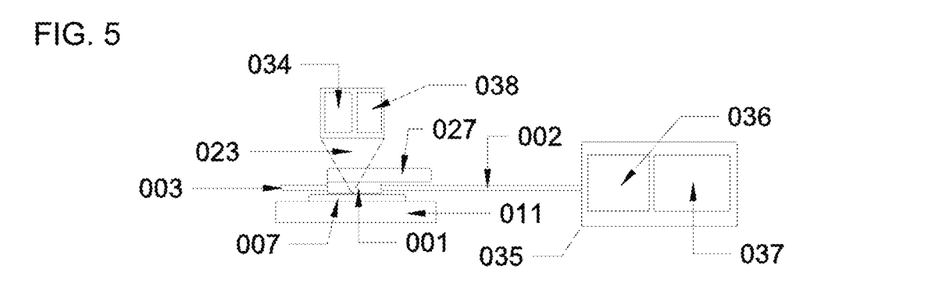

In a second aspect, the present invention also relates to a laser plasma spectrochemistry system. For example, FIG. 5 shows such system according to embodiments of the present invention. The laser spectrochemistry system comprises a laser light source 034 adapted for focusing a laser beam on the material sample 007 near the aperture 005 defined in aforementioned tubular element 002 of the laser ablation probe 001, a laser ablation probe 001 according to embodiments of the first aspect of the present invention, and an apparatus for the characterization of aforementioned aerosol 035, which may comprise a sample preparation system 036 and/or a spectrochemical analysis device 037. The spectrochemical analysis device may comprise an ICP-OES or ICP-MS instrument and/or as will be indicated below an LIBS spectrometer 038. The LIBS spectrometer analyses the aerosol at the ablation site (in the central portion, at the sample chamber), as opposed to other methods which require transport of the aerosol. The fluid outlet 004 of the tubular element of the laser ablation probe is operably connected to a fluid sample input of the sample preparation system or the apparatus for the characterization of aforementioned aerosol 035. A laser plasma spectrochemistry system may comprise one or more sample preparation systems 036, e.g., an inductively coupled plasma torch device 014 for generating a plasma from the Ar supplied and the aerosol and fluid provided by the laser ablation probe 001, and/or may comprise one or more spectrochemical analysis devices 037 for analyzing the aerosol, such as a mass spectrometer, or an optical emission spectrometer. A laser induced breakdown spectrometer, positioned at the sample chamber could also be used for analyzing purposes either in combination with other spectrochemical analysis devices or separately. The performance of the system as a whole is advantageously improved by the use of a laser ablation probe 001 according to embodiments of the present invention. For example, a laser ablation probe according to embodiments of the present invention may achieve an exceptional particle washout time (full width of the pulse response at 1% of the maximum of said pulse response) of about 5 ms, e.g., when the central chamber is positioned at a distance of about 400 mm from the torch inlet of an ICP-MS device. Surprisingly, considering the dimensions of the probe and the distance between the central chamber and the torch inlet, it was expected that the cell would achieve washout in 20 to 30 ms. One possible explanation of the higher than expected efficiency, the present invention not being limited by such theoretical considerations or the validity of such hypothetical considerations as described hereafter, could be that the momentum of helium atoms in an environment of substantially higher pressure relative to the atmospheric pressure, e.g., about 0.1-1 bar relative to 1,01325 bar absolute pressure, in combination with a reflected plasma shockwave 038, characteristic for embodiments of the probe as described herebefore, is capable of compressing and confining the expanding aerosol plume. In some embodiments, the internal operational pressures of the carrier gas/fluid used may rise well above atmospheric pressure to confine the plume. In some embodiments, the gasses used may be He or $H_2$, having superior fluid dynamic characteristics, but other fluids may also be used, such as, for example but not limited to, liquids. This could thus result, hypothetically, in a much faster washout in external ablation cells than previously thought possible. The diameter of the sampling aperture 005 of the cell was made smaller than the diameter of the conduit 002, creating a pseudo-cylindrical wall 012, capable of reflecting and directing the shockwave 038 towards the plume more efficiently than conventional designs. The concept of shockwave reflection and direction is demonstrated in FIG. 7.

Computational fluid dynamics simulations predict the speed of a helium carrier gas in the central chamber 016, when supplied at a flow rate greater than 0.5 L/min, may vary among embodiments of the invention between subsonic speeds (with respect to helium gas at 293K and 1 bar of absolute pressure) of approximately 10 m/s, which is in the same order of magnitude as the speed of the ejected particles upon collision with the probe walls, and supersonic speeds (with respect to helium gas at 293K and 1 bar of absolute pressure). The initial particle ejection speed may be about $10^4$-$10^6$ m/s, but particle speed may quickly go down due to drag, e.g., due to dampening by collisions with the carrier gas flow, particularly in a relative higher pressure environment. Therefore, the flow may be capable of shielding the walls from high velocity particle impact via momentum transfer, i.e. inertial confinement.

Figure 6:
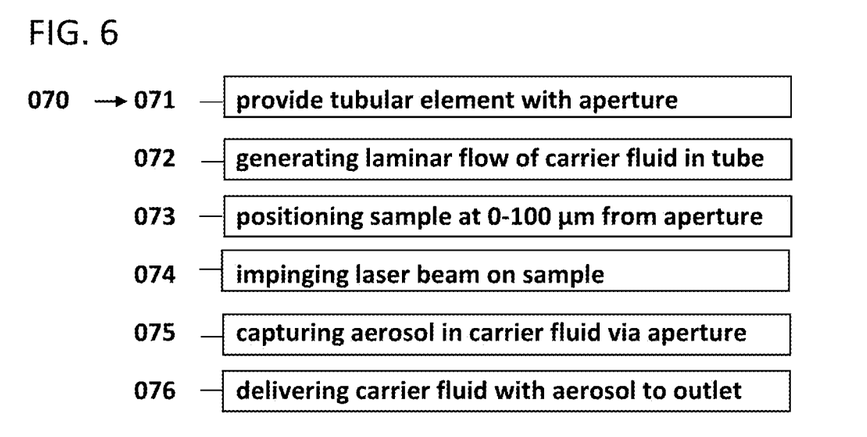

In a third aspect, the present invention also relates to a method for aerosol collection from a material sample and enabling subsequent analysis of the aerosol, such as the method 071 according to embodiments of the present invention schematically illustrated in FIG. 6. This method 070 comprises the step 071 of providing a tubular element having an aperture defined in a central portion thereof, wherein the central portion curves or extends outward with respect to the tubular element in a direction substantially orthogonal to the aperture. For example, providing the tubular element may comprise providing a laser ablation probe according to embodiments of the first aspect of the present invention. The method further comprises generating 073 a substantially laminar flow of a carrier fluid through the tubular element. The method also comprises positioning 073 a material sample outside of the tubular element at a distance in the range of 0 μm to 100 μm from the aperture, impinging 054 a laser beam on the material sample in a region referred to as a 'laser ablation site' to generate an aerosol from the material sample by laser ablation and capturing 075 the aerosol in the carrier fluid through the aperture. The method 070 further comprises delivering 076 the aerosol entrained in the carrier fluid to an outlet of the tubular element. Specific details relating to a method according to embodiments of the present invention will be clear from the description provided hereinabove in relation to the first and second aspect of the present invention.

Figure 7:
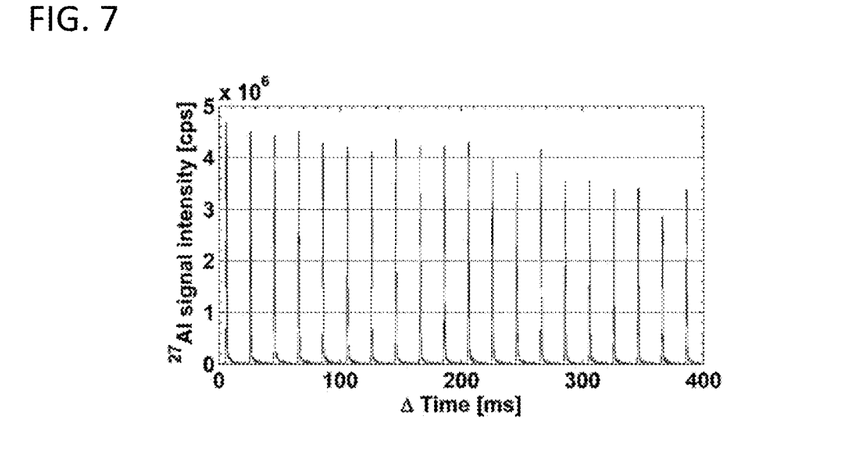
Figure 8:
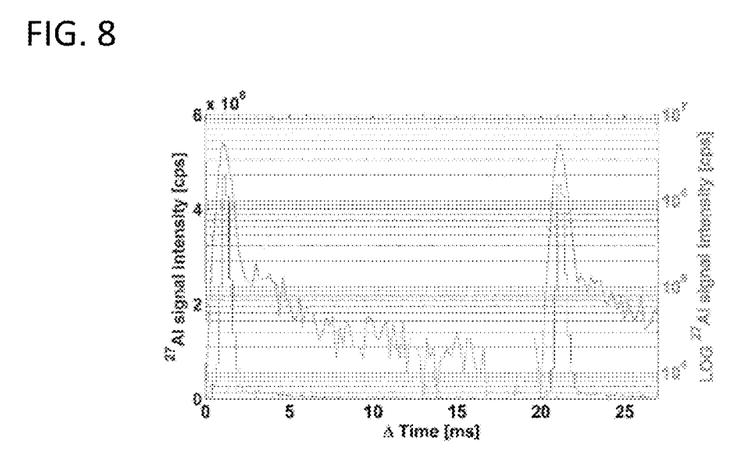
Figure 9:
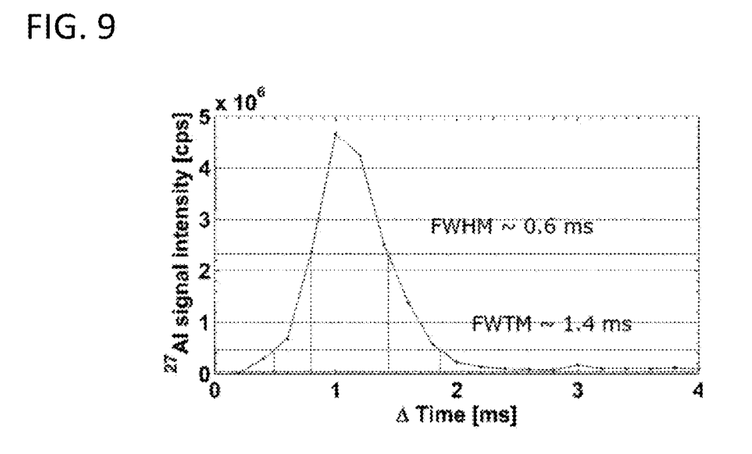
Figure 10:
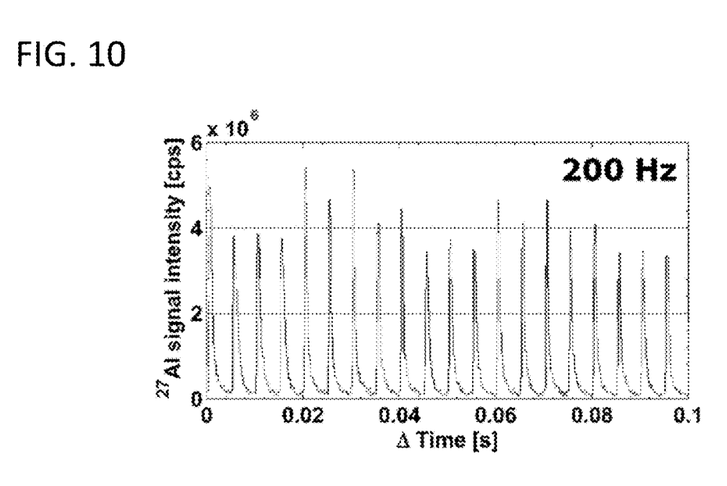
Figure 11:
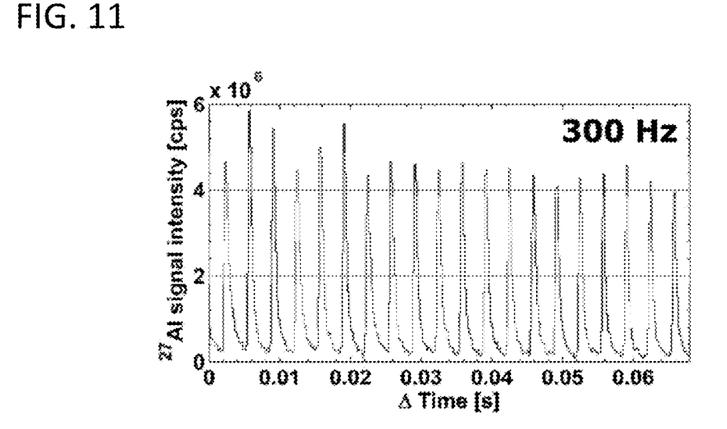
Figure 12:
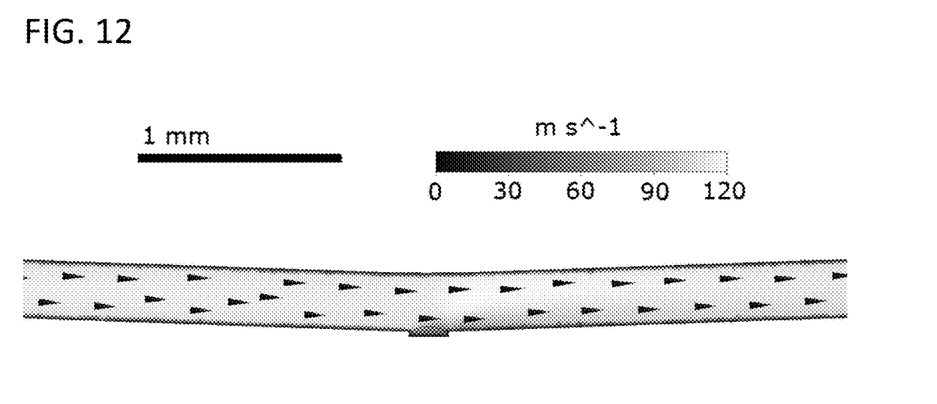
Figure 13:
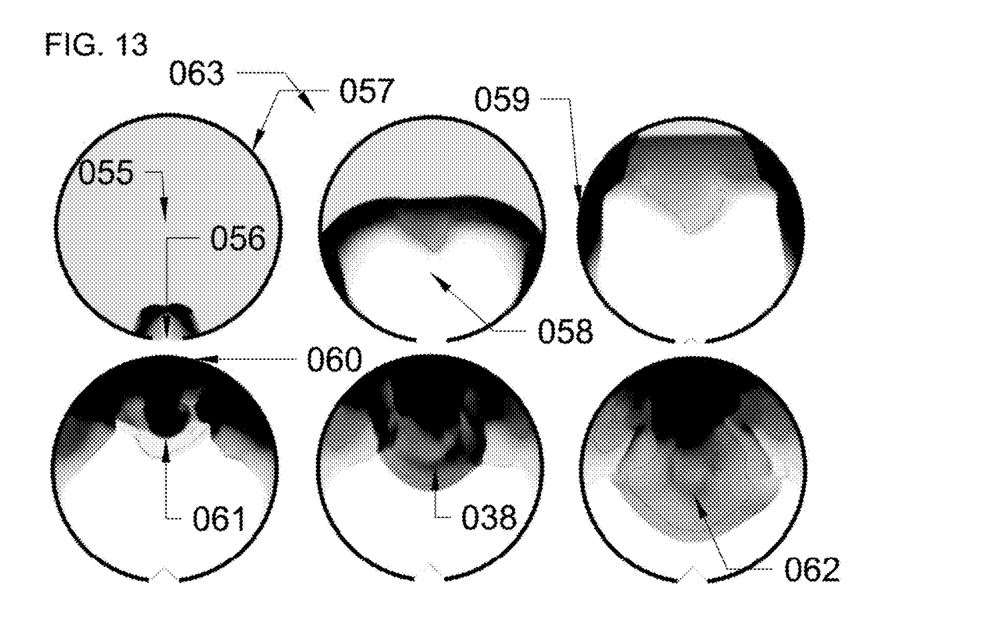

Exemplary performance data are provided hereinbelow for a laser ablation-inductively coupled plasma-mass spectrometry (LA-ICP-MS) setup equipped with an ablation probe according to embodiments of the present invention. The probe was fixed within a purpose-build bracket attached to the bi-directional translation stage of an Analyte G2 (Photon Machines Inc., Bozeman, Mont., USA) 193 nm ArF* excimer laser system (pulse length<5 ns, approximately 1% energy stability, 5.45 J $cm^{-2}$ energy density) coupled to an Agilent 7900 quadrupole-based ICP-MS instrument (Agilent Technologies Inc., Tokyo, Japan), and evaluated by repeated ablation at a single region of NIST SRM 612 in sequences of 50 pulses under optimized conditions. The ICP-MS unit was operated at an RF power of 1500 W, the flow rates tuned to 0.21 $min^{-1}$ for the Ar auxiliary gas, 151 $min^{-1}$ for the Ar plasma gas, and 1.65 1 $min^{-1}$ for the He carrier gas. The read time was set to 200 μs. The central chamber was located about 400 mm away from the ICP torch. Aerosol washout of said low dispersion ablation probe and the connecting tubular element for $^{27}$Al (NIST SRM 612, 5 μm square spot, 50 Hz, 5.45 J cm$^{-2}$) was achieved in <4.7±0.4 ms (average full width of the pulse response at 1% of the maximum of said pulse response in a sequence of 20 pulses) under optimized conditions, enabling adequately separated pulse responses at frequencies up to 200-300 Hz. For setups such as exemplified here, in which the probe, in accordance with embodiments of the present invention, is mounted externally, the total contribution of radial (gas flow rotational motion) and co-axial mixing inside the conduit, between probe and ICP, to the dispersion increases with conduit length. The physical limits for the transfer-induced dispersion of any setup consisting of an external ablation cell a considerable distance away from the ICP 053 can be put into perspective by comparing it to the aerosol washout time of 1-3 ms for in-torch ablation, in which the sample is located in extremely close proximity to the ICP 053, or in which the cell is a part of the torch assembly 014. As the cell performs similarly to in-torch ablation with respect to the dispersion generated, the physical limits of LA-ICP-MS are nearly achieved in its current mode of operation. In FIG. 7, a sequence of 20 sequential pulses (NIST SRM 612, 5 μm square spot, drilling at 50 Hz, 5.45 J cm$^{-2}$) is displayed. Zoomed in versions are provided in FIG. 8 and FIG. 9. The limits of detection based on the abundance-normalized peak height sensitivities for $^{115}$In, $^{140}$Ce, $^{232}$Th and $^{238}$U, are approximately 0.25 ppm. In FIG. 10 and FIG. 11, the spatiotemporal signal profile at high pulse repetition rates is shown; it is evident that pulse responses remain adequately separated at repetition rates up to 200-300 Hz. FIG. 12 schematically illustrates the hypothetical velocity vector scale distribution of He atoms within the internal volume of a probe according to one embodiment of the present invention. This distribution was calculated by a 3-D computational fluid dynamics simulation based on Reynolds Averaged Navier-Stokes equations closed by a k-ε Eddy viscosity turbulence model. It exemplifies the situation of quasi-laminar flow within the central region and a quasi-homogeneous velocity vector field near the aperture being maintained at very high carrier fluid flow rates. Vectors indicate the carrier fluid local trajectory, the grayscale indicates the local speed. In FIG. 13, the exemplary progressive temporal evolution of a blast wave propagation simulation in a cross-section of a tubular element is illustrated schematically in hatchet-pattern of snap-shots. A spherical or cylindrical super-sonic (external) plasma shockwave is expected to propagate away from the ablation site 056 upon formation of the aerosol. When the shockwave reaches a tubular wall, the dense gas at the shock front accumulates, until it is reflected from the tubular wall 057. The increased density in the boundary layer may prevent particles from impacting the wall at high velocity. The reflected plasma shockwave front 061,038, which may be a non-regular Mach wave, or a sonic wave, may be directed towards the centre of said tubular element 062, directly opposite to the trajectory of ejected particles of high kinetic energy, which may be accelerated by an electromagnetic field or via laser-supported detonation. Such particles may be trapped in the centre of the tube, where they may be carried away by a quasi-laminar flow. This process is expected to occur within the first μs after laser impingement.

The invention claimed is:

1. An ablation probe comprising a tubular element adapted for conducting a carrier fluid in a substantially laminar flow, said tubular element comprising:
a fluid inlet and a fluid outlet arranged at opposite end portions of the tubular element for enabling said carrier fluid to flow through the tubular element,
a central portion having a transparent wall transparent for laser radiation used for laser ablating and an aperture defined in the central portion for admitting an aerosol generated by laser ablation from a material sample into the carrier fluid flow when said sample is positioned outside said tubular element at a distance in the range of 0 μm to 100 μm from said aperture,
wherein the central portion is configured for generating, in the central portion, the carrier fluid flow substantially parallel to the sample and that said central portion curves or extends outward with respect to the tubular element in a direction substantially orthogonal to said aperture such that the fluid inlet and/or the fluid outlet of the tubular element form a slight angle with respect to a direction substantially parallel to the aperture at the central portion at the location where the tubular element is bent,
wherein the ablation probe comprises a positioning device arranged for positioning the aperture at a distance in the range of 0 μm to 100 μm relative to the sample,
wherein the aperture is arranged at an apex of the slight angle,
wherein said central portion curves or extends outward in the direction substantially orthogonal to said aperture such that the central portion extends in a direction non-parallel to a sample surface of the material sample and such that a first portion of the tubular element at the aperture is at a lesser distance from the sample surface of the material sample than is a second portion of the tubular element from the sample surface of the material sample, and
wherein the tubular element is configured for allowing to contact the material sample locally around the aperture.

2. The laser ablation probe according to claim 1, wherein said central portion curves outward with respect to the tubular element in a direction substantially orthogonal to the aperture such as to form an acute angle at the central portion between the fluid inlet and a direction substantially parallel to the aperture in the range of 1° to 45°.

3. The laser ablation probe according to claim 1, wherein said central portion curves outward with respect to the tubular element in a direction substantially orthogonal to the aperture such as to form an acute angle at the central portion between the fluid outlet and a direction substantially parallel to the aperture in the range of 1° to 45°.

4. The laser ablation probe according to claim 1, wherein an exterior wall of the central portion of the tubular element is shaped so as to induce a local protruding portion around the aperture for contacting the sample.

5. The laser ablation probe according to claim 1, wherein said aperture encompasses a surface area less than or equal to a cross-sectional area spanning the opening of said tubular element in said central portion.

6. The laser ablation probe according to claim 5, wherein said cross-sectional area spanning the opening of said tubular element corresponds to a cross-section of the tubular element having a maximum inner diameter of 2 mm or less, and/or wherein said central portion is shaped so as to restrict the contact area between the tubular element and a flat sample to less than 2 mm$^2$.

7. The laser ablation probe according to claim 5, wherein the distance between said aperture and the fluid outlet of tubular element ranges between 50 and 5000 mm.

8. The laser ablation probe according to claim 1, wherein said central portion is adapted for transmitting a laser radiation beam through the tubular element such as to generate said aerosol from said material sample by laser ablation.

9. The laser ablation probe according to claim 1, wherein said aperture has a substantially elliptical or circular shape and/or wherein said tubular element has a substantially circular or elliptical cross-sectional shape.

10. The laser ablation probe according to claim 1, wherein said fluid outlet is adapted for directly connecting to an injector of an inductively coupled plasma torch.

11. The laser ablation probe according to claim 1, furthermore comprising a sample platform for supporting the material sample, said sample platform being adapted for translating, flexing, rotating and/or tilting the material sample with respect to the aperture.

12. The laser ablation probe according to claim 1, furthermore comprising a housing enclosing said tubular element and adapted for containing the material sample in a controlled atmosphere.

13. The laser ablation probe according to claim 1, furthermore comprising a plurality of micro-jets adapted to provide a sheathing gas stream to prevent or reduce mixing of a gaseous environment external to the tubular element with the carrier fluid via the aperture.

14. A laser plasma spectrochemistry system comprising a laser ablation probe according to claim 1 and a spectrochemical analysis device, wherein the fluid outlet of the tubular element of said laser ablation probe is operably connected to a fluid sample input of the spectrochemical analysis device.

15. A method for aerosol collection from a material sample, the method comprising:
providing a tubular element having an aperture defined in a central portion thereof, wherein the central portion curves or extends outward with respect to the tubular element in a direction substantially orthogonal to the aperture, such that a fluid inlet part and/or a fluid outlet part of the tubular element form a slight angle with respect to a direction substantially parallel to the aperture at the central portion at the location where the tubular element is bent, the aperture being arranged at an apex of the slight angle, wherein the tubular element is provided such that the central portion extends in a direction non-parallel to a sample surface of the material sample and such that a first portion of the tubular element at the aperture is at a lesser distance from the sample surface of the material sample than is a second portion of the tubular element from the sample surface of the material sample, the tubular element being configured for allowing to contact the material sample locally around the aperture,
- generating a substantially laminar flow of a carrier fluid through the tubular element,
- positioning a material sample outside of said tubular element at a distance in the range of 0 μm to 100 μm from said aperture,
- impinging a laser beam on said material sample through a transparent wall of the tubular element, to generate an aerosol from said material sample by laser ablation,
- capturing said aerosol in the carrier fluid through said aperture the carrier fluid flow being substantially parallel to the sample, and
- delivering the carrier fluid entraining the aerosol to an outlet of the tubular element.

16. The laser ablation probe according to claim 1, wherein the aperture is arranged so as to not substantially influence the fluid flow.

17. The laser ablation probe according to claim 2, wherein

- the fluid inlet is arranged at a first end of the tubular element, and
- the fluid outlet is arranged at a second end of the tubular element, the second end of the tubular element being opposite from the first end such that the tubular element enables said carrier fluid to flow through the tubular element.

18. The laser ablation probe according to claim 1, wherein said central portion curves or extends outward with respect to the tubular element in the direction substantially orthogonal to said aperture so as to only locally contact the material sample at the first portion of the tubular element around the aperture while the second portion of the tubular element does not contact the material sample.

19. The laser ablation probe according to claim 1, wherein an exterior wall of the central portion of the tubular element is shaped so as to induce a local protruding portion around the aperture for locally contacting the material sample.

20. An ablation probe comprising a tubular element adapted for conducting a carrier fluid in a substantially laminar flow, said tubular element comprising:

- a fluid inlet and a fluid outlet arranged at opposite end portions of the tubular element for enabling said carrier fluid to flow through the tubular element,
- a central portion having a transparent wall transparent for laser radiation used for laser ablating and an aperture defined in the central portion for admitting an aerosol generated by laser ablation from a material sample into the carrier fluid flow when said sample is positioned outside said tubular element at a distance in the range of 0 μm to 100 μm from said aperture,
- wherein the central portion is configured for generating, in the central portion, the carrier fluid flow substantially parallel to the sample and that said central portion curves or extends outward with respect to the tubular element in a direction substantially orthogonal to said aperture such that the fluid inlet and/or the fluid outlet of the tubular element form a slight angle with respect to a direction substantially parallel to the aperture at the central portion at the location where the tubular element is bent, and
- wherein the ablation probe further comprises a positioning device arranged for positioning the aperture at a distance in the range of 0 μm to 100 μm relative to the sample,
- wherein said central portion curves or extends outward in the direction substantially orthogonal to said aperture such that the central portion extends in a direction non-parallel to a sample surface of the material sample and such that a first portion of the tubular element at the aperture is at a lesser distance from the sample surface of the material sample than is a second portion of the tubular element from the sample surface of the material sample,
- wherein the tubular element is configured for allowing to contact the material sample locally around the aperture,
- wherein the aperture is arranged at an apex of the slight angle, and
- wherein the ablation probe further comprises
  - a housing enclosing said tubular element and adapted for containing the material sample in a controlled atmosphere, and a plurality of micro-jets adapted to provide a sheathing gas stream to prevent or reduce mixing of a gaseous environment external to the tubular element with the carrier fluid via the aperture.

21. The laser ablation probe according to claim 1, wherein the probe is adapted to contact the material sample and wherein a contact area between the tubular element and the sample surface of the material sample is less than 2 mm$^2$.

\* \* \* \* \*